UNITED STATES PATENT OFFICE.

MAX DOHRN, OF CHARLOTTENBURG, AND ALBRECHT THIELE, OF BERLIN, GERMANY, ASSIGNORS TO CHEMISCHE FABRIK AUF ACTIEN (VORM. E. SCHERING), OF BERLIN, GERMANY.

MANUFACTURE OF PHENYLATED 6.6-DIQUINOLYL-4.4-DICARBOXYLIC ACIDS AND HOMOLOGUES.

1,032,123.  Specification of Letters Patent.  Patented July 9, 1912.

No Drawing.  Application filed February 27, 1912.  Serial No. 680,203.

*To all whom it may concern:*

Be it known that we, MAX DOHRN, doctor of philosophy, chemist, and ALBRECHT THIELE, doctor of philosophy, chemist, citizens of the German Empire, residing, respectively, at Luisenplatz 3, Charlottenburg, and Bundesratsufer 5, Berlin, Empire of Germany, have invented a new and useful Improvement in the Manufacture of Phenylated 6.6-Diquinolyl-4.4-Dicarboxylic Acids and Homologues, of which the following is a specification.

If anilin, benzaldehyde and pyroracemic acid react together there is obtained as is known 2-phenylquinolin-4-carboxylic acid.

According to this invention the phenylated-6.6-diquinolyl-4.4-dicarboxylic acid and its homologues are obtained, if in place of anilin, substituted diphenyls, as benzidin or tolidin of dianisidin are employed. If in place of benzaldehyde, a substituted benzaldehyde is employed, the corresponding substitution product is obtained.

Examples.

(1.) An alcoholic solution of 65 grams of benzidin, 61 grams of pyroracemic acid and 75 grams of benzaldehyde are boiled for some hours. 6.6-diquinolyl-2.2-diphenyl-4.4-dicarboxylic acid

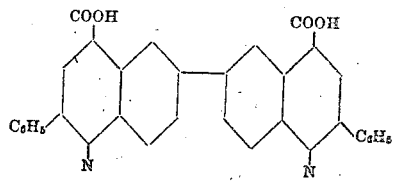

separates out. It is filtered and crystallizes from glacial acetic acid. The new compound is of a yellowish brown color and melts at 225 centigrade; is insoluble in water and alcohol and soluble in glacial acetic acid.

(2.) An alcoholic solution of 35 grams benzidin, 30 grams pyroracemic acid and 35 grams salicylaldehyde are treated in alcoholic solution as in Example 1. The 6.6-diquinolyl-2.2-dioxyphenyl-4.4-dicarboxylic acid is also insoluble in water and alcohol and melts at 248 centigrade. The process proceeds in a similar manner when tolidin and dianisidin are employed.

(3.) 106 grams tolidin and 106 grams benzaldehyde are warmed in 1200 ccm. of absolute alcohol and boiled with the gradual addition of 88 grams of pyroracemic acid for eight hours with a reflux condenser. After standing for twenty four hours the liquor is sucked off while hot and the precipitate is boiled with alcoholic ether to purify it. The 8.8-dimethyl-6.6-diquinolyl-2.2-diphenyl-4.4-dicarboxylic acid obtained is a yellow powder insoluble in the usual solvents and does not melt at 300 centigrade.

(4.) 122 grams of dianisidin are boiled together with 106 grams benzaldehyde in 1200 ccm. of absolute alcohol with the addition of 88 grams of pyroracemic acid and the product obtained purified. The 8.8-dimethoxy-6.6-diquinolyl-2.2-diphenyl-4.4-dicarboxylic acid is a brown substance which melts at about 290 centigrade and is insoluble in the usual solvents.

In the following claims the expression "phenylated 6.6-diquinolyl-4.4-dicarboxylic acids" includes also the homologues of these compounds.

We claim as our invention:

1. As new chemical products the phenylated 6.6-diquinolyl-4.4-carboxylic acids, being powders, insoluble in water and in the usual organic solvents, substantially as described.

2. As new chemical product 6.6 diquinolyl-2.2-diphenyl-4.4-dicarboxylic acid, having the formula

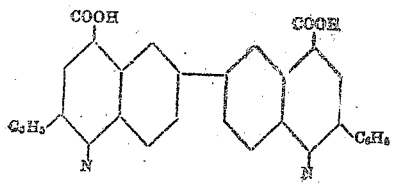

and melting at about 225 centigrade, being insoluble in water and alcohol and soluble in glacial acetic acid, substantially as described.

3. Process of manufacturing phenylated 6.6-diquinolyl-4.4-dicarboxylic acids, which consists in causing substituted diphenyls, aromatic aldehydes and pyroracemic acid to react together and isolating the product thus formed, substantially as described.

4. Process of manufacturing 6.6-diquinolyl-2.2-diphenyl-4.4-dicarboxylic acid, which consists in heating an alcoholic solution of benzidin, pyroracemic acid and benzaldehyde, and isolating the product thus formed, substantially as described.

In testimony whereof we have hereunto set our signatures in the presence of two subscribing witnesses.

MAX DOHRN.
ALBRECHT THIELE.

Witnesses:
HENRY HASPER,
M. REICHENBACH.